US012624973B2

(12) United States Patent
Ikeda et al.

(10) Patent No.: US 12,624,973 B2
(45) Date of Patent: May 12, 2026

(54) OPTICAL FIBER SENSOR UTILIZING FARADAY ROTATOR MIRRORS AND MEASURING SYSTEM USING THE SAME

(71) Applicant: Hakusan Corporation, Tokyo (JP)

(72) Inventors: Toshiharu Ikeda, Tokyo (JP); Tsutomu Yamate, Tokyo (JP); Masashi Saijo, Tokyo (JP); Minoru Yoshida, Tokyo (JP)

(73) Assignee: HAKUSAN CORPORATION, Tokyo (JP)

( * ) Notice: Subject to any disclaimer, the term of this patent is extended or adjusted under 35 U.S.C. 154(b) by 176 days.

(21) Appl. No.: 18/380,343

(22) Filed: Oct. 16, 2023

(65) Prior Publication Data

US 2024/0255320 A1     Aug. 1, 2024

(30) Foreign Application Priority Data

Jan. 31, 2023     (JP) ................................... 2023-13351
Jun. 16, 2023     (JP) ................................... 2023-98884

(51) Int. Cl.
G01D 5/353          (2006.01)
G01B 9/02015        (2022.01)
          (Continued)

(52) U.S. Cl.
CPC ....... G01D 5/3539 (2013.01); G01B 9/02018 (2013.01); G01B 9/02027 (2013.01);
          (Continued)

(58) Field of Classification Search
CPC ............. G01D 5/3539; G01D 5/35303; G01D 5/35332; G01D 5/366; G01D 5/35306;
          (Continued)

(56) References Cited

U.S. PATENT DOCUMENTS 5,946,429 A      8/1999  Huang et al.
6,449,046 B1 *   9/2002  Huang ............... G01D 5/35303
                                                    385/12
          (Continued)

FOREIGN PATENT DOCUMENTS

JP          5118004          1/2013
JP          5702623          4/2015
          (Continued)

OTHER PUBLICATIONS

Extended European Search Report issued Aug. 13, 2024 in corresponding European Patent Application No. 23206376.8.
          (Continued)

*Primary Examiner* — Jennifer D Bennett
(74) *Attorney, Agent, or Firm* — Wenderoth, Lind & Ponack, L.L.P.

(57)          ABSTRACT

The present invention is the optical fiber sensor, that laser pulses from a laser source are separated into a reference path and a measurement path by the second optical coupler via the first optical coupler, the first FRM is provided at an end of the reference path, the second FRM is provided at an end of the measurement path, and the reference reflected light of the first FRM and the measurement reflected light of the second FRM are interfered at the second optical coupler and are converted into three phases. The first phase pulses are transmitted to the optical synthesis section via the first optical coupler, second phase pulses are transmitted to the optical synthesis section via the first delay section, and third phase pulses are transmitted to the optical synthesis section via the second delay section. The time division pulse train is outputted from the optical synthesis section.

5 Claims, 10 Drawing Sheets

(51) Int. Cl.
|          |            |
|----------|------------|
| *G01B 9/02018* | (2022.01) |
| *G01B 9/02056* | (2022.01) |
| *G01D 5/36* | (2006.01) |
| *G01H 9/00* | (2006.01) |

(52) U.S. Cl.
CPC ..... *G01B 9/02058* (2013.01); *G01D 5/35303* (2013.01); *G01D 5/35332* (2013.01); *G01D 5/366* (2013.01); *G01H 9/004* (2013.01)

(58) Field of Classification Search
CPC .............. G01H 9/004; G01B 2290/70; G01B 9/02027; G01B 9/02058; G01B 9/02018; G01P 15/093
See application file for complete search history.

(56) References Cited

U.S. PATENT DOCUMENTS

| 2007/0065156 A1* | 3/2007 | Lin ...................... G01R 15/246 |
| | | 398/152 |
| 2012/0297883 A1* | 11/2012 | Kupershmidt ......... G01H 9/004 |
| | | 73/655 |

| 2014/0326860 A1 | 11/2014 | Choi et al. |
| 2017/0131431 A1* | 5/2017 | Cekorich .............. G01H 9/006 |
| 2024/0068893 A1* | 2/2024 | Sun .................... G01K 11/3206 |

FOREIGN PATENT DOCUMENTS

| JP | 6002329 | 10/2016 | |
| JP | 2018-9896 | 1/2018 | |
| JP | 2018009896 A * | 1/2018 | |
| WO | 2015/012094 | 1/2015 | |
| WO | WO-2015012094 A1 * | 1/2015 | ........... G01P 15/093 |

OTHER PUBLICATIONS

Roland Fuest et al., "Interferometric displacement sensor realized with a planar 3×3 directional coupler in glass", SPIE vol. 1794, Integrated Optical Circuits II (1992), pp. 352-365.
Thiemo Lang et al., "Integrated Optics for Displacement Sensors", Invited Paper, SPIE vol. 3226 (Sep. 1997), pp. 156-167.
Johannes Kremmel et al., "Passive aligned assembly of an integrated optical displacement sensor based on a reflective Mach-Zehnder interferometer with a 3×3 directional coupler", Optical Engineering, vol. 57, No. 8, 087103 (Aug. 2018), pp. 087103-1-087103-8.

* cited by examiner

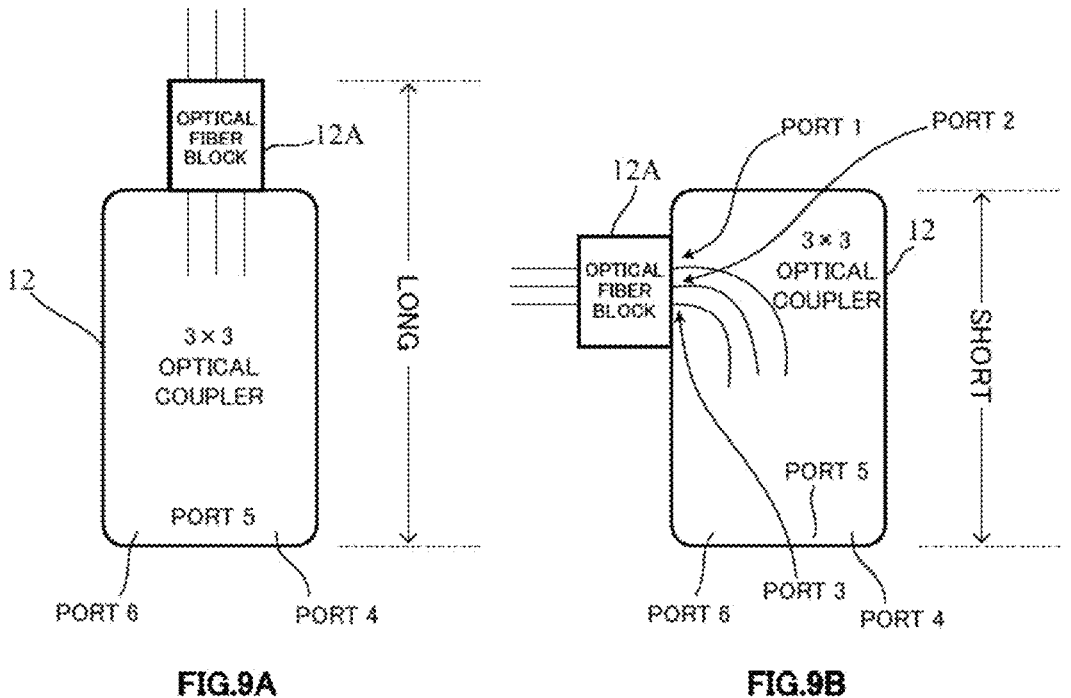
FIG.9A                              FIG.9B

OPTICAL FIBER SENSOR UTILIZING FARADAY ROTATOR MIRRORS AND MEASURING SYSTEM USING THE SAME

BACKGROUND OF THE INVENTION

1. Technical Field of the Invention

The present invention relates to an optical sensor that reduces an influence of a transmission path by converting three outputs into one pulse train of a one output with a Time Division Multiplexing (TDM) by extracting a phase information with 3×3 optical couplers in a sensor section having an interferometer instead a phase shift light-pulse system using a delay circuit, and to a measuring system using the optical fiber sensor.

2. Description of the Prior Art

Based on reasons that an optical fiber sensor is capable of not having a power source for an optical sensor section and so on, the optical fiber sensor is superior for an application to a position where an electromagnetic environment is bad or to a position where a temperature environment is bad in comparison with a conventional electrical sensor. Further, it is also possible to show a superior characteristic for a long-distance sensing according to a low loss characteristic of the optical fiber. Consequently, many kinds of sensors using the optical fiber are proposed (e.g. Japanese Patent No. 5,118,004 (Patent Document 1), Japanese Patent No. 5,702, 623 (Patent Document 2), Japanese Patent No. 6,002,329 (Patent Document 3), Japanese Published Unexamined Patent Application No. 2018-9896 (Patent Document 4)).

In the conventional homodyne system, there is a defect that the intensity fluctuation of the reference light and the measurement light which are interference inputs and the intensity fluctuation of the light of the interference output become an error of the interference output signal. Further, in the conventional homodyne system, the linearity is the best setting that a phase relation between the reference light and the measurement light is put on an operating point being the phase difference 90 degrees. However, it is necessary to need a high machining accuracy to constantly keep the light path length of the reference light and the measurement light. It is further necessary to also keep the constant relation for the thermal expansion. In this manner, there is a difficulty on the manufacturing. Furthermore, in the conventional homodyne system, the phase difference between the reference light and the measurement light is put on 90 degrees and the maximum phase fluctuation is ±90 degrees, and it is in principle impossible to exceed these set degrees.

As the technique to resolve such the problems of the conventional homodyne system, the real time displacement measuring method using the phase shift light-pulse system disclosed in Patent Documents 1 to 4, is proposed. However, since the delay line is needed in one side of the interferometer, the performance deterioration is caused by the characteristic change of the delay line according to the environmental fluctuation.

SUMMARY OF THE INVENTION

The present invention has been made in view of the above described problems, and an object of the present invention is to provide an optical fiber sensor being capable of measuring at a high accuracy without the external influence with a cheap configuration using 3×3 optical couplers in order to reduce the external influence of the real time displacement measuring performance using the phase shift light-pulse system, and to provide a measuring system using the optical fiber sensor.

In accordance with the present invention, there is provided an optical fiber sensor, wherein laser pulses from a laser source are separated into two phases of a reference path and a measurement path including a measuring object, which form an interferometer, by a second optical coupler via a first optical coupler; wherein a first Faraday Rotator Mirror (FRM) is provided at an end of the reference path, and a second FRM is provided at an end of the measurement path; and wherein a reference reflected light of the first FRM and a measurement reflected light of the second FRM are interfered at the second optical coupler and are converted into three phases, converted first phase pulses are transmitted to an optical synthesis section via the first optical coupler, converted second phase pulses are transmitted to the optical synthesis section via a first delay section, converted third phase pulses are transmitted to the optical synthesis section via a second delay section, and a time division pulse train is outputted from the optical synthesis section.

In accordance with the present invention, there is provided the optical fiber sensor, wherein laser pulses from a laser source are transmitted to a second Polarization Maintaining (PM) optical coupler by a first PM fiber via a polarizer and a first PM optical coupler; wherein the laser pulses are separated into two phases of a reference path and a measurement path including a measuring object, which form an interferometer, at the second PM optical coupler and are transmitted by a second PM optical fiber; wherein a first mirror is provided at an end of the reference path, and a second mirror is provided at an end of the measurement path; wherein a reference reflected light of the first mirror and a measurement reflected light of the second mirror are interfered at the second PM optical coupler and are converted into three phases; wherein converted first phase pulses are outputted by a third PM fiber via the first PM optical coupler and is transmitted to an optical synthesis section by a first SM optical fiber being connected to the third PM fiber; wherein converted second phase pulses are outputted from the second PM optical coupler by a fourth PM fiber and is transmitted to the optical synthesis section, via a first delay section, by a second SM fiber being connected to the fourth PM fiber; wherein converted third phase pulses are outputted from the second PM optical coupler by a fifth PM fiber and is transmitted to the optical synthesis section, via a second delay section, by a third SM fiber being connected to the fifth PM fiber; and wherein a time division pulse train is outputted from the optical synthesis section.

Further, in accordance with the present invention, there is provided an optical fiber sensor that measuring pulses are transmitted to "n(≥2)" interferometers respectively including a measuring object, and Time Division Multiplexing (TDM) pulse trains corresponding to respective displacements of the measuring objects from the "n" interferometers are optically synthesized and are outputted, wherein "n−1" optical couplers to convert laser pulses into two phases of the measuring pulses and delaying pulses are provided; wherein a first stage optical coupler inputs laser pulses from a laser source, and a second stage to (n−1)th stage optical couplers respectively input the delaying pulses from a previous stage via a delay section; wherein n-th optical coupler transmits the delaying pulses from (n−1)th optical coupler to the n-th interferometer and inputs; and wherein respective TDM pulse trains outputted from the "n" inter-ferometers are sequentially and optically synthesized, and a multiple TDM pulse train is outputted.

Furthermore, in accordance with the present invention, there is provided an optical fiber sensor, wherein laser pulses from a laser source are separated into two phases of a reference path and a measurement path including a measuring object, which form an interferometer, by a second optical coupler via a first optical coupler; wherein a first mirror is provided at a junction tip of the second optical coupler of the reference path, and a collimator lens is provided at a junction tip of the second optical coupler of the measurement path; wherein a spatial coupling is formed by the second optical coupler and the measuring object, and a second mirror to reflect a measuring light is provided in the spatial coupling; wherein laser pulses from the collimator lens are inputted to the measuring object via the spatial coupling, a signal light reflected on the second mirror is interferes with a reflected light of the first mirror, and interfered light is converted into three phases at the second optical coupler; and wherein converted first phase pulses are transmitted to an optical synthesis section via the first optical coupler, converted second phase pulses are transmitted to the optical synthesis section via a first delay section, converted third phase pulses are transmitted to the optical synthesis section via a second delay section, and a time division pulse train is outputted from the optical synthesis section.

Still further, in accordance with the present invention, there is provided an optical fiber sensor, wherein laser pulses from a laser source are separated into two phases of a reference path and a measurement path including a measuring object, which form an interferometer, by a second optical coupler via a first optical coupler; wherein an end face mirror is provided at a junction tip of the second optical coupler of the reference path, and a collimator region is provided at a junction tip of the second optical coupler of the measurement path; wherein a spatial coupling is formed by an input and output section of the second optical coupler and a prism mirror in the measuring object; wherein laser pulses of the reference path are returned to the second optical coupler by reflecting at the end surface mirror, a laser pulse outputted from the collimator region are entered to the end surface mirror via the prism mirror in the spatial coupling, a signal light reflected on the end surface mirror is inputted to the collimator region via the prism mirror and is returned to the second optical coupler, and returned light is converted into three phases at the second optical coupler; and wherein converted first phase pulses are transmitted to an optical synthesis section via the first optical coupler, converted second phase pulses are transmitted to the optical synthesis section via a first delay section, converted third phase pulses are transmitted to the optical synthesis section via a second delay section, and a time division pulse train is outputted from the optical synthesis section.

Still furthermore, in accordance with the present invention, there are provided measuring systems using the respective above optical fiber sensors.

BRIEF DESCRIPTION OF THE DRAWINGS

In the accompanying drawings:

FIGS. 9A and 9B are schematic drawings explaining an optical fiber block;

DESCRIPTION OF THE PREFERRED EMBODIMENTS

Figure 1:
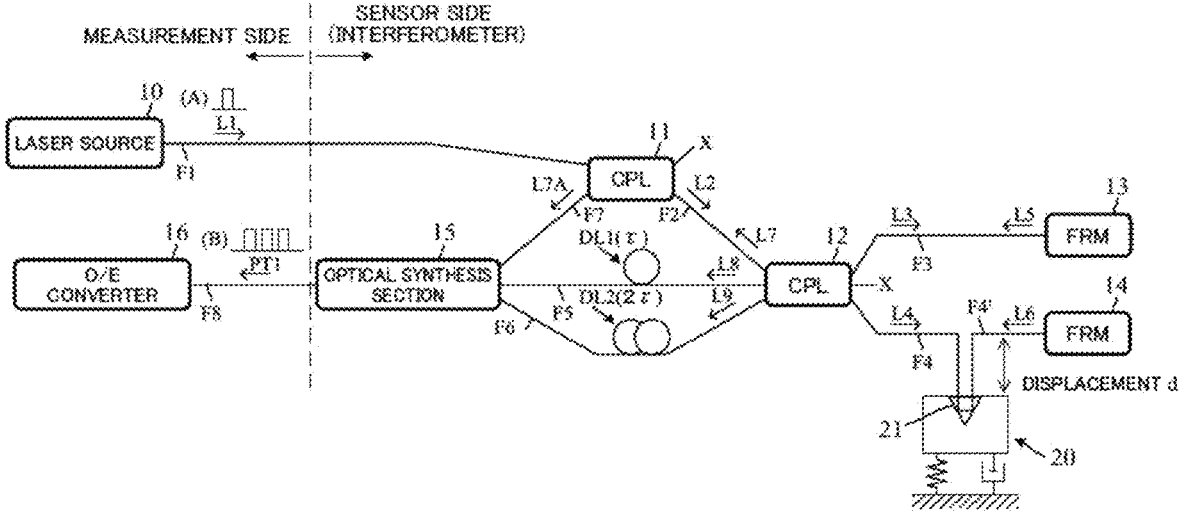
FIG. 1 is a block diagram showing the first embodiment of the present invention.

The present invention is especially composed by consid-ering influences of a polarization characteristic, a tempera-ture fluctuation, a light source wave length fluctuation and a transmission path in order to reduce an external influence in a real time displacement measurement using a phase shift light-pulse system. In this manner, the influence of the polarization characteristic, the temperature fluctuation, the light source wave length fluctuation and the transmission path in the optical fiber sensor will be explained.

First, the explanation on the influence of the polarization characteristic will be described. When a light (a laser) is propagated in a Single Mode (SM) fiber, a polarization state in random fluctuates. However, the fluctuation of the polar-ization state from a light junction to the interference is same with the phase change, and it causes the performance deterioration. Although it is considered that a Faraday Rota-tor Mirror (FRM) is used to remove the fluctuation of the polarization state, it is not perfect. The longer the length of the fiber of two interference paths (the reference path and the measurement path) of the interferometer is, the larger the influence is. Further, the FRM limits the miniaturization of the sensor. On the other hand, in the phase shift light-pulse system, the two interference paths of the interferometer need a certain length to generate the phase difference, and the length cannot be excess shortened. By composing by using a Polarization Maintaining (PM) fiber instead of the SM fiber, the polarization state is stable, the FRM also become unnecessary and a cheap mirror can be substituted for the FRM. However, there is a problem that the cost of the whole system configuration increases since the expensive PM fiber is used.

Next, the explanation on the influence of the temperature fluctuation will be described. The length and the refractive index of the SM fiber change according to the temperature and then the phase of the laser changes. The temperature difference of the two interference paths (the reference path and the measurement path) of the interferometer becomes a factor of the temperature fluctuation and leads to the great cause of the performance decreases. Accordingly, it is sig-nificant that the temperature difference of the two interfer-ence paths is small as much as possible. However, in a case that the lengths of the two interference paths are different, the influence of the temperature difference cannot be ignored since the wiring positions are different.

Regarding the influence of the fluctuation of the light source wave length, the interference is not influenced by the wave length fluctuation in a case that the lengths of the two interference paths are equivalent. However, in a case that the lengths of the two interference paths have a difference, the wave length fluctuation becomes the phase fluctuation and does not the cause of the performance deceases.

Finally, the influence of the transmission path will be described. When the vibration, the pressure or the temperature is applied on any one of the optical fibers of the two interference paths of the interferometer, the phase difference is occurred based on the changing of the refractive index or the like. In this connection, the two interference paths are required to have the configuration not to be influenced by the vibration, the pressure and the temperature as much as possible. In a case that the same positions of the two interference paths are the constitution to be similarly influenced even if the changes of the vibration, the pressure or the temperature are occurred, it is possible to reduce the influence of the temperature or the like by mutually being cancelled.

Considering the above explanations, it is clear that reducing the difference between the two interference paths is effective in order to improve the performance of an optical fiber sensor of the phase shift light-pulse system. However, this leads to narrow the width and the interval of the light pulses, and a higher speed and higher precise analog to digital (AD) converter and an electric circuit working till a high frequency are needed in order to receive the interference signal and then to measure the displacement. Accordingly, the improvement of the performance is limited. In addition, there is a problem that the configurational cost becomes up. In this connection, the interferometer using the 3×3 optical coupler can solve the problems such as the limit of the performance improvement and the cost described above.

Further, since it is possible to consolidate the outputs into one by pulsing the laser and further combining with the TDM technology, it is possible to improve the performance and reduce the cost. Furthermore, by composing the interferometer using the PM fiber while the advantage of the 3×3 optical coupler system is maintained, it is possible to remove the FRM in the interferometer and substitute the cheap mirror. Thereby, the high temperature operating specification and the miniaturization of the sensor can be realized. In addition, it is possible to reduce the cost of the whole system by using the PM fiber for only the source laser transmission cable and by using the SM fiber for the optical transmission cable of the interferometer.

Embodiments according to the present invention will be described below with reference to the accompanying drawings. FIG. 1 shows the first embodiment of the present invention, a laser source 10 and a 2×2 optical coupler 11 is connected by an SM fiber F1, and the 2×2 optical coupler 11 and a 3×3 optical coupler 12 is connected by an SM fiber F2. Two series SM fibers F3 and F4, F4' to compose an interferometer are connected to the 3×3 optical coupler 12, and the SM fiber F3 forms a reference path and the SM fibers F4, F4' form a measurement path. FRMs 13 and 14 are respectively connected to tip portions of the SM fibers F3 and F4' via a prism of a spatial coupling, an accelerator sensor 20 being a measuring object is arranged at a halfway of the SM fibers F4 and F4' in the measurement path, and a relative displacement "d" of the accelerator sensor 20 is optically measured. The accelerator sensor 20 includes a prism mirror 21. An SM fiber F5 including a delay section DL1 (e.g., a delay time is τ) and an SM fiber F6 including a delay section DL2 (e.g., a delay time is 2τ) are in parallel connected between the 3×3 optical coupler 12 and an optical synthesis section (a logical sum, "OR" operation) 15, and an SM fiber F7 is connected between the optical synthesis section 15 and the 2×2 optical coupler 11. Then, one SM fiber F8 being an output line is connected to the optical synthesis section 15, and an optical signal to electric signal (O/E) converter 16 to convert an optical signal of pulse train into an electrical signal is connected at a tip portion of the SM fiber F8.

Besides, the optical synthesis section 15 can be comprised by the 3×3 optical coupler. Further, the delay time τ of the delay section DL1 and the delay time 2τ of the delay section DL 2 are example and they are optionally changeable.

In such a configuration, an operation example of the first embodiment will be described with reference to a flow chart of FIG. 2.

First, the laser pulse L1 is sent from the laser source 10 (Step S1), and the laser pulse L1 is transmitted by the SM fiber F1 and is transmitted to the 3×3 optical coupler 12 by the SM fiber F2 as the laser pulse L2 via the 2×2 optical coupler 11 (Step S2). The laser pulse L2 is separated into the laser pulses L3 and L4 of the two phases for the interference by the 3×3 optical coupler 12 (Step S3), and the laser pulses L3 and L4 are respectively transmitted by the SM fiber F3 in the reference path and SM fibers F4, F4' in the measurement path. The laser pulse L3 for the reference is reflected by the FRM 13 at the end portion and is inversely transmitted in the SM fiber F3 as the reflected reference laser pulse L5 (Step S4). Further, the separated laser pulse L4 for the measurement is transmitted via the measuring section in the accelerator sensor 20 (Step S5) and then is reflected by the FRM 14 at the end portion of the SM fiber F4' (Step S6). The reflected measuring pulse laser is inversely transmitted in the SM fibers F4' and F4 as the measuring pulse L6 and is transmitted to the 3×3 optical coupler 12 via the measuring section in the accelerator 20 (Step S7).

The reflected reference laser pulse L5 and the reflected measuring laser pulse L6 which are respectively returned by the SM fibers F3 and F4, are transmitted to the 3×3 optical coupler 12. The interference is occurred at the 3×3 optical coupler 12, and the 3×3 optical coupler 12 converts the interfered pulses into the laser pulses L7, L8 and L9 of three phases (Step S10). The conversion from the two phases to the three phase at the 3×3 optical coupler 12 converts is performed in accordance with the following Expression 1.

$$L7 = C + B \cdot \cos(\varphi) \qquad \text{Expression 1}$$
$$L8 = C + B \cdot \cos(\varphi + 2\pi/3)$$
$$L9 = C + B \cdot \cos(\varphi - 2\pi/3)$$

where, φ: the phase difference between the reflected reference laser pulse L5 and the reflected measuring laser pulse L6, C: a constant showing a direct current (DC) offset, and B: a constant showing an alternative current (AC) amplitude.

The converted first laser pulse L7 is transmitted to the 2×2 optical coupler 11 by the SM fiber F2 (Step S11) and is further transmitted to the optical synthesis section 15 as the laser pulse L7A (the peak value is X1) by the SM fiber F7 from the 2×2 optical coupler 11 (Step S12). Further, the converted second laser pulse L8 (the peak value is X2) is transmitted by the SM fiber F5 (Step S13) and is transmitted to the optical synthesis section 15 via the delay section (the delay time is τ) DL1 (Step S14). The converted third laser pulse L9 (the peak value is X3) is transmitted by the SM fiber F6 (Step S15) and is also transmitted to the optical synthesis section 15 via the delay section (the delay time is 2τ) DL2 (Step S16).

Although the optical synthesis section 15 synthesize (logical "OR") the transmitted laser pulses L7A, L8 and L9 (Step S20), the output pulse train PT1 is the form in a time division multiplexed since the laser pulses L8 and L9 are respectively delayed by the delay times τ and 2τ in comparison with the laser pulse L7A. The outputted pulse train PT1 is inputted to the O/E converter 16 and is converted into the electric signal (Step S21). By measuring the peak values X1, X2 and X3 of the respective pulses by using the calculating section or the like, the relative displacement d of the accelerator 20 is calculated (Step S22).

In the above first embodiment, although the SM fibers are used as the whole optical fiber and the FRMs are used as the light reflection member, the second embodiment partially using a Polarization Maintaining (PM) fiber will be explained with reference to FIG. 3 corresponding to FIG. 1.

Figure 3:
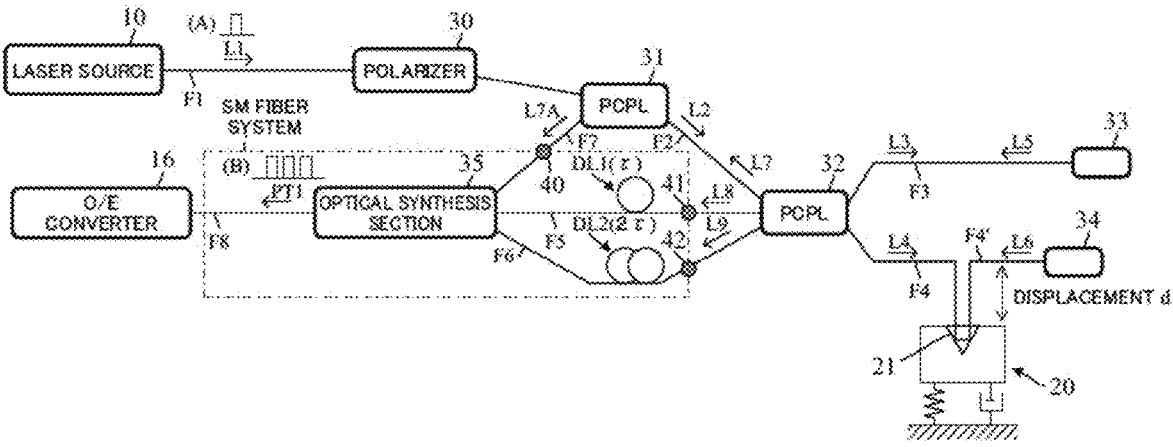
FIG. 3 is a block diagram showing the second embodiment of the present invention.

As shown in FIG. 3, the SM fiber is used only for a SM fiber system surrounded by a dashed line in the interferometer, and another portion is all the PM fibers. The boundary of the SM fiber system is joined with SM-PM junctions 40 to 42 which are applicable a known technology such as a connector. A polarizer 30 is inserted in the input path of the laser pulse L1 sent from the laser source 10, and it removes a minute polarized wave fluctuation occurred in the long distance transmission by the PM fiber. Since the PM fibers are used in the whole region except for the SM fiber system, a polarization surface-keeping optical coupler 31 is used in place of the 2×2 optical coupler 11 of the first embodiment and a polarization surface-keeping optical coupler 32 is used in place of the 3×3 optical coupler 12 of the first embodiment. Further, the FRM is unnecessary since the PM fiber is used, and general mirrors 33 and 34 are respectively arranged at end portions of the reference path and the interference path in the interferometer.

Figure 2:
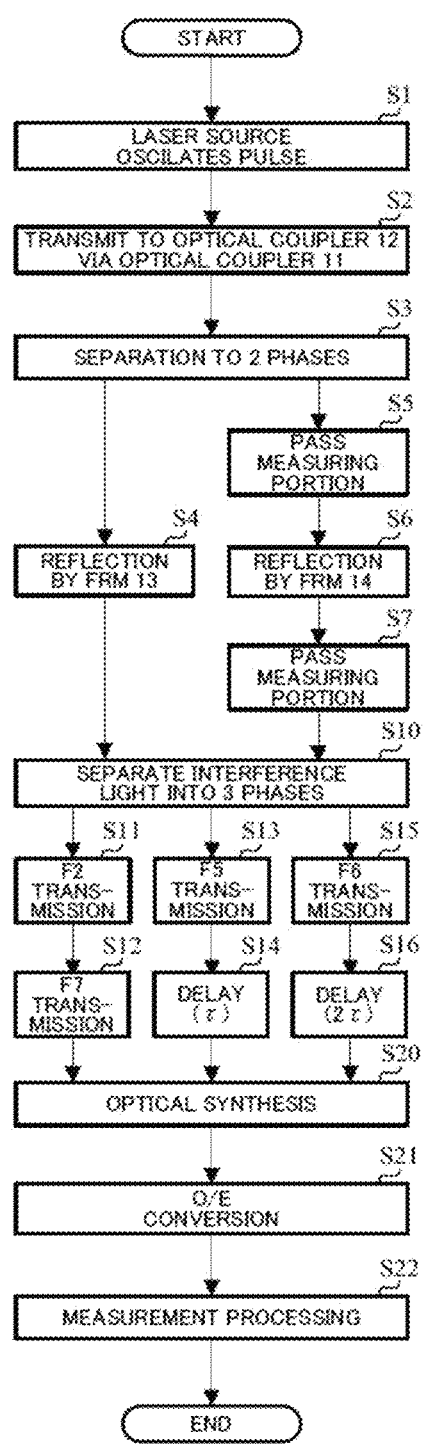
FIG. 2 is a flow chart showing an example operation of the first embodiment of the present invention.

The second embodiment is the above configuration, and the operation is similar to that shown in the FIG. 2 of the first embodiment. That is, the part of transmission path comprising of the SM fibers of the first embodiment is merely replaced to the PM fibers, and the flow and operation of the laser pulse are the same with the first embodiment.

Figure 4:
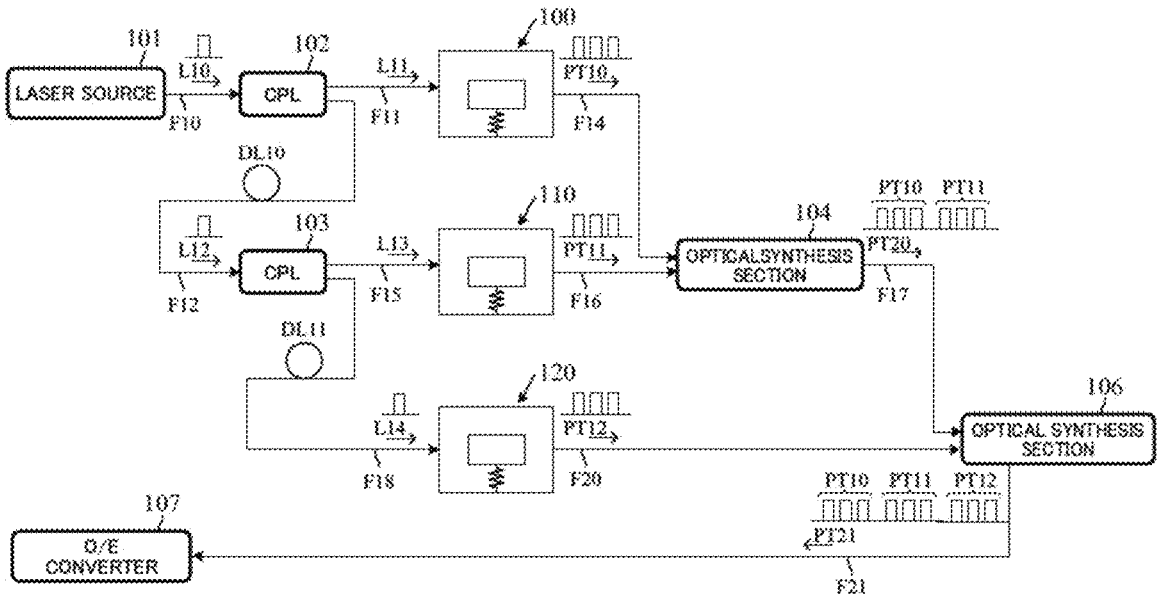
FIG. 4 is a block diagram showing the second embodiment of the present invention.

Next, the third embodiment to simultaneously measure plural measuring objects with the time division multiplexing will be described with reference to FIG. 4. Although FIG. 4 shows three interferometers 100, 110 and 120 as the measuring object, the number is not limited three. The interferometers 100, 110 and 120 are the same configuration and are the same with the configuration of the sensor side (the interferometer) shown in FIG. 1.

A laser source 101 sending a laser pulse L10 is connected to an optical coupler 102 by an SM fiber F10, and the optical coupler 102 is connected to the interferometer 100 by an SM fiber F11 and is connected to an optical coupler 103 by an SM fiber F12 via a delay section DL10. Further, a TDM output of the interferometer 100 is inputted to an optical synthesis section 104 by an SM fiber F14, and the optical coupler 103 is connected to the interferometer 110 by an SM fiber F15 and is connected to the interferometer 120 by an SM fiber F18 via a delay section DL11. A TDM output of the interferometer 110 is inputted to an optical synthesis section 104 by an SM fiber F16, and a synthesized output of the optical synthesis section 104 is inputted to an optical coupler 106 by an SM fiber F17. A TDM output of the interferometer 120 is inputted to an optical synthesis section 106 by an SM fiber F20, and a synthesized output of the optical synthesis section 106 is inputted to an optical signal to electrical signal (O/E) converter 107 by an SM fiber F21.

Figure 5:
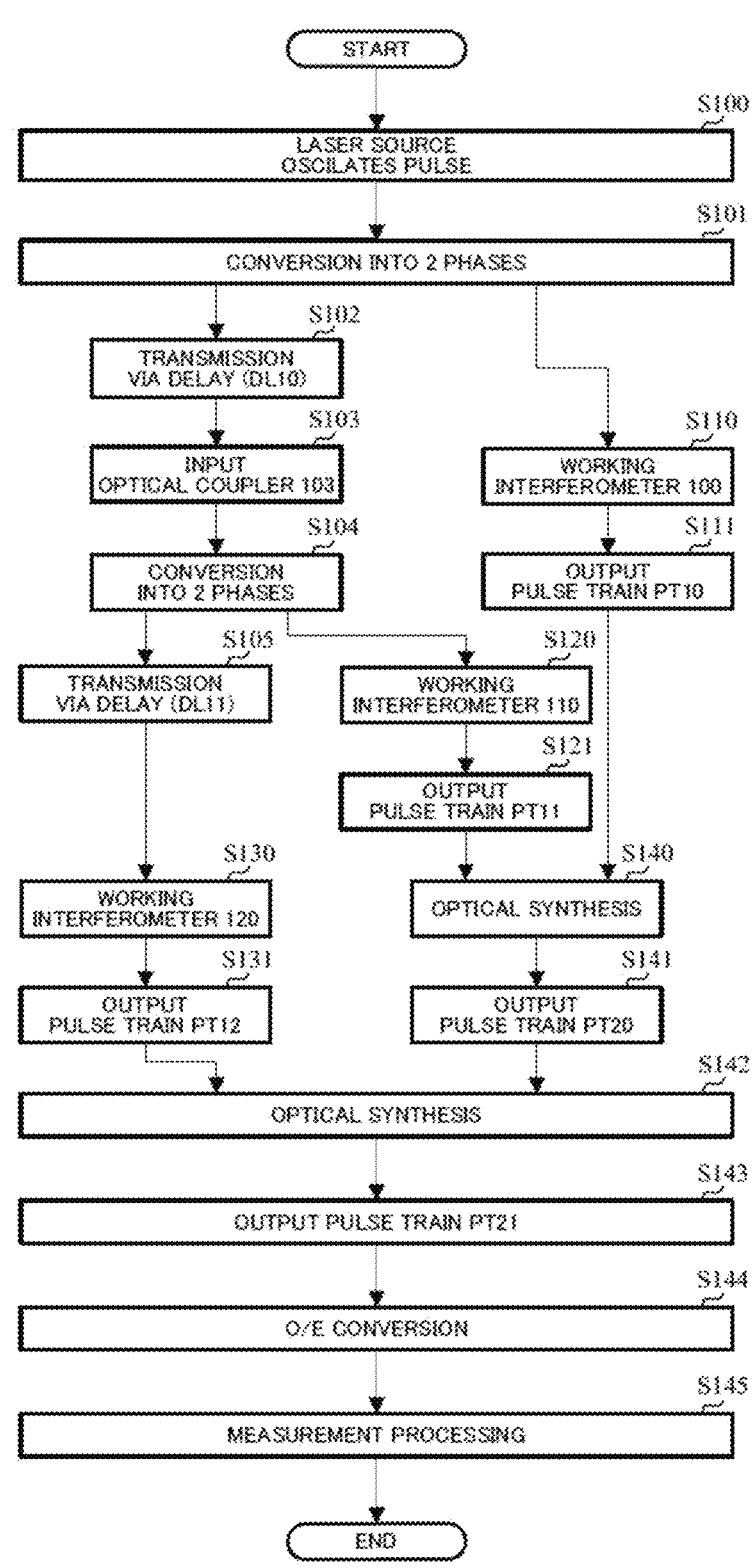
FIG. 5 is a flow chart showing an example operation of the second embodiment of the present invention.

In such a configuration, an operation of the third embodiment will be described with reference to a flow chart of FIG. 5.

First, the laser pulse sent from the laser source 101 is transmitted to the optical coupler 102 by the SM fiber F10 (Step S100), and is separated into the measuring pulse L11 and the delaying pulse L12 of the two phase pulses at the optical coupler 102 (Step S101). The measuring pulse L11 from the optical coupler 102 is transmitted to the interferometer 100 by the SM fiber F11, and the same operation explained in the first embodiment is performed in the interferometer 100 (Step S110). The pulse train PT10 of the time division is outputted from the interferometer 100 and is transmitted to the optical synthesis section 104 by the SM fiber F14 (Step S111). Further, the delaying pulse L12 from the optical coupler 102 is transmitted to the optical coupler 103 by the SM fiber F12 (Step S103) via the delay section DL10 (Step S102), and is separated into the measuring pulse L13 and the delaying pulse L14 of the two phase pulses at the optical coupler 103 (Step S104). The measuring pulse L13 is transmitted to the interferometer 110 by the SM fiber F15, and the same operation explained in the first embodiment is performed in the interferometer 110 (Step S120). The pulse train PT11 of the time division is outputted from the interferometer 110 and is transmitted to the optical synthesis section 104 by the SM fiber F16 (Step S121).

Further, the delaying pulse L14 from the optical coupler 103 is transmitted to the interferometer 120 by the SM fiber F18 (Step S103) via the delay section DL11 (Step S105). The interferometer 120 performs the above described operation (Step S130), and the pulse train PT12 of the time division is outputted from the interferometer 120 (Step S131).

The pulse trains PT10 and PT11 are synthesized in the time axis at the optical synthesis section 104 (Step S140), the synthesized pulse train PT20 is formed (Step S141), and the pulse train PT120 is transmitted to the optical synthesis section 106.

The pulse train PT12 of the time division from the interferometer 120 is transmitted to the optical synthesis section 106 by the SM fiber F20, the pulse trains PT12 and PT20 are synthesized in the time axis at the optical synthesis section 106 (Step S142), and the synthesized pulse train PT21 is outputted (Step S143). The pulse train PT21 is transmitted to the O/E converter 107 and is O/E-converted (Step S144), and the relative displacements of the respective accelerators in the interferometers 100, 110 and 120 by measuring the peak values of the pulses of the respective pulse trains (Step S145).

Although the number of the measuring object are three (the interferometers 100, 110 and 120) in the third embodiment shown in FIG. 4, it may be appropriately the interferometers of "n (≥2)". That is, the optical fiber sensor is the configuration that measuring pulses are transmitted to "n (≥2)" interferometers respectively including a measuring object, and the TDM pulse trains corresponding to respective displacements of the measuring objects from the "n" interferometers are optically synthesized and are outputted, wherein "n−1" optical couplers to convert laser pulses into the two phases of the measuring pulses and delaying pulses are provided; wherein the first stage optical coupler inputs laser pulses from the laser source, and the second stage to (n−1)th stage optical couplers respectively input the delaying pulses from a previous stage via a delay section; wherein n-th optical coupler transmits the delaying pulses from (n−1)th optical coupler to the n-th interferometer and inputs; and wherein respective TDM pulse trains outputted from the "n" interferometers are sequentially and optically synthesized, and a multiple TDM pulse train is outputted.

Figure 6:
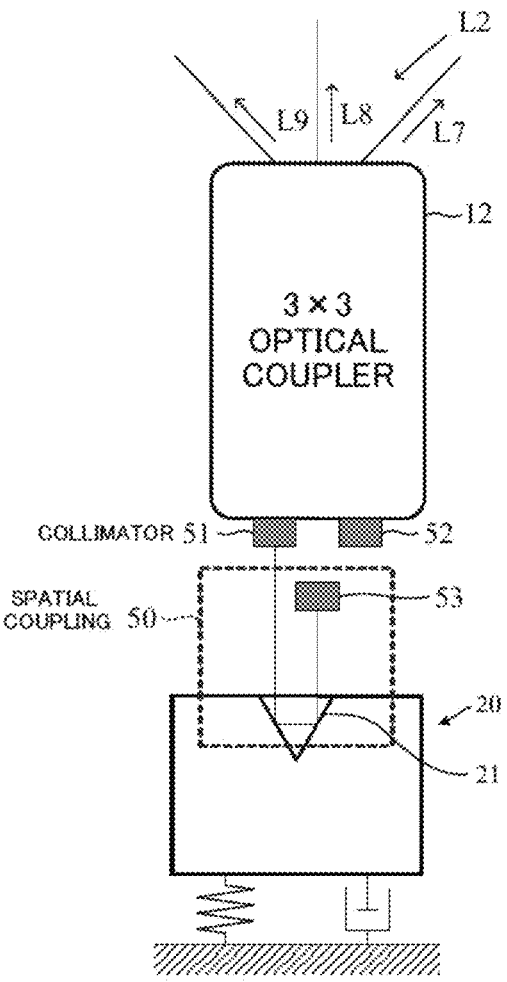
FIG. 6 is a partial configuration diagram showing the first modification of the present invention.

FIG. 6 shows the first variation (a customized optical coupler) of the present invention, and a collimator lens 51 and a mirror 52 are respectively provided on the tips of the junction of the 3×3 optical coupler 12. The collimated laser pulse at the collimator lens 51 is inputted to the spatial coupling 50, further is inputted to the accelerator 20 and is returned by the mirror 53 in the spatial coupling 50. The laser pulse (the signal light) retuned by the mirror 53 is interfered with the reflected light (the reference light) of the mirror 52.

Since the interferometer configured such the spatial coupling 50 does not have entirely the optical fiber, the wiring of the optical fiber is not necessary. Since the influence of the polarization is not received, the FRM is not necessary and the miniaturization is capable. In addition, by applying the optical waveguide technology and the Micro Electro Mechanical Systems (MEMS) technology, it is possible to more minute the 3×3 optical coupler integrated the collimator lens and the mirror, and the acceleration sensor.

Figure 7:
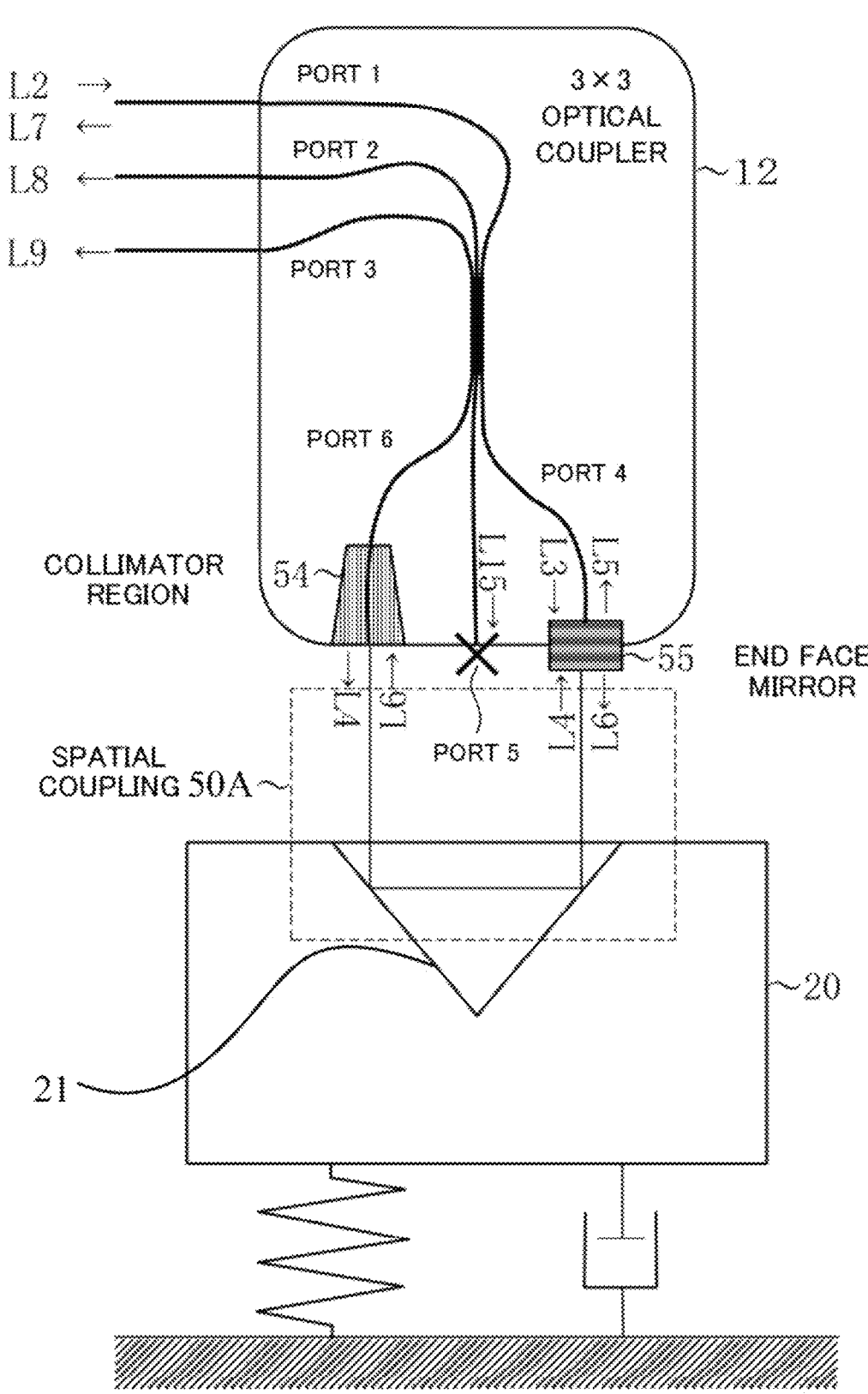
FIG. 7 is a partial configuration diagram showing the second modification of the present invention.
Figure 8:
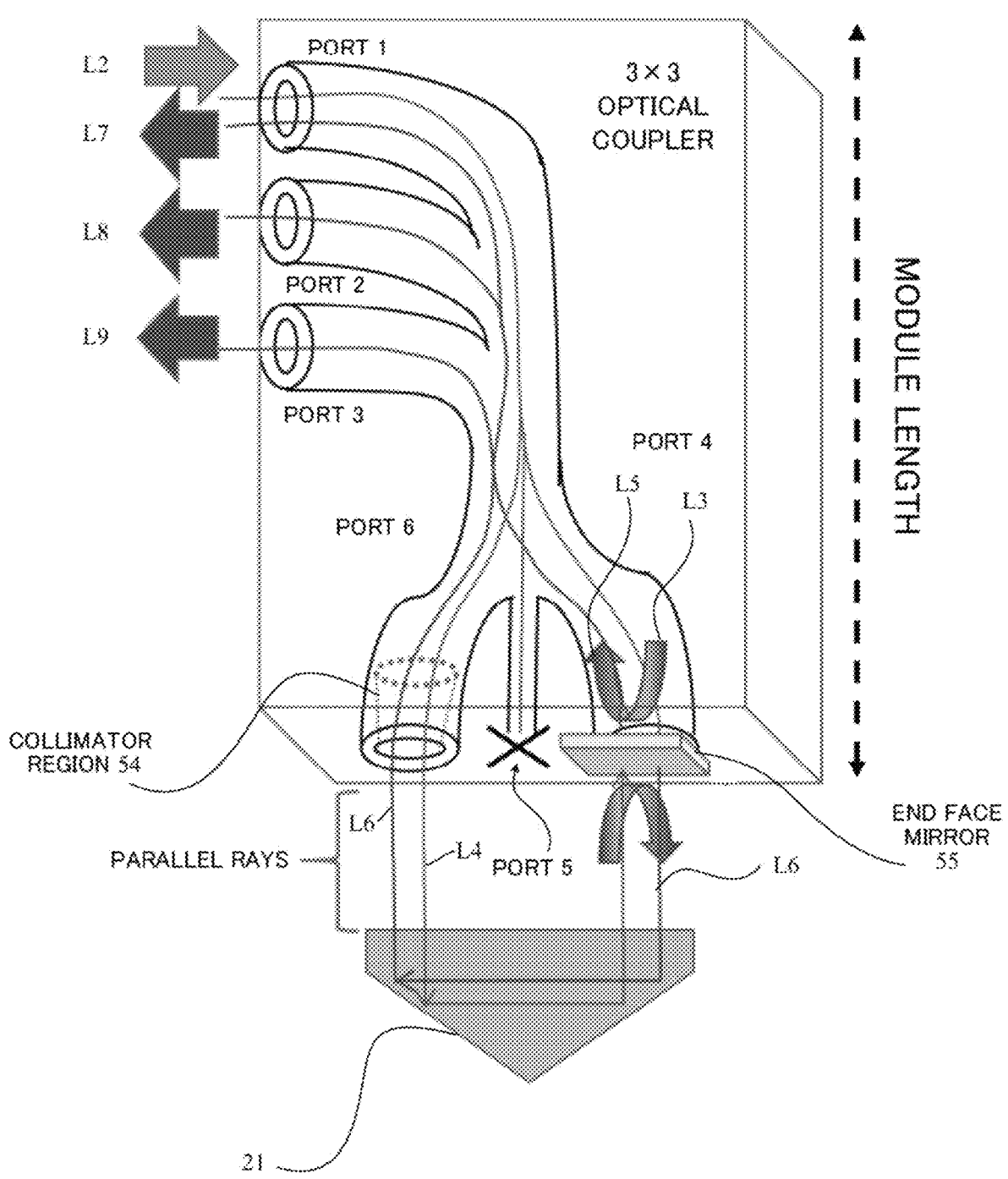
FIG. 8 is a schematic diagram showing the configuration of FIG. 7.

FIGS. 7 and 8 show the second variation of the present invention, and a collimator region 54 and an end surface mirror (both sides mirror) 55 are provided on the tips of the junction of the 3×3 optical coupler 12. The spatial coupling 50A is formed in the accelerator 20 including the prism mirror 21. The end surface mirror 55 is provided on the end portion of the port 4, and the laser pulse L3 of the port 4 is reflected (L5) by the end surface mirror 55 in the CPL (the 3×3 optical coupler) 12 and is returned to the optical connecting section. Further, the laser pulse L4 of the port 6 is reflected (L6) by the end surface mirror 55 out the CPL 12 and is returned to the optical connecting section. The end surface mirror 55 is formed by depositing the metal to both sides of the end portion of the portion 4. The metal for the deposition is the metal, such as "Ti—Au" or "Al", to reflect the light of the 1550 [nm] band.

The collimator region 54 regulated the mode field diameter and the opening number of the waveguide is provided at an exit in the 3×3 optical coupler 12 of the port 6, and the laser pulse L4 passed the collimator region 54 passes the prism mirror 21 in the accelerator 20 as the parallel rays. Then, the laser pulse L6 reflected by the end surface mirror 55 again passes the prism mirror 21, and is entered in the collimator region 54 of the port 6 and is returned to the optical connecting portion.

The ports 1 to 3 are respectively set on the surface of 90 degree of the ports 4 to 6 as shown in FIG. 9B, and it is possible to mount an optical fiber block 12A of an external connection to perform the optical input and output for the ports 1 to 3. Based on the horizontal mount of the optical fiber block 12A, it is possible to shorten the module length in comparison with the vertical mount shown in FIG. 9A. Besides, the optical fiber block 12A is a connection parts to draw out the signal lines from the 3×3 optical coupler 12.

Figures 10A, 10B, 10C:
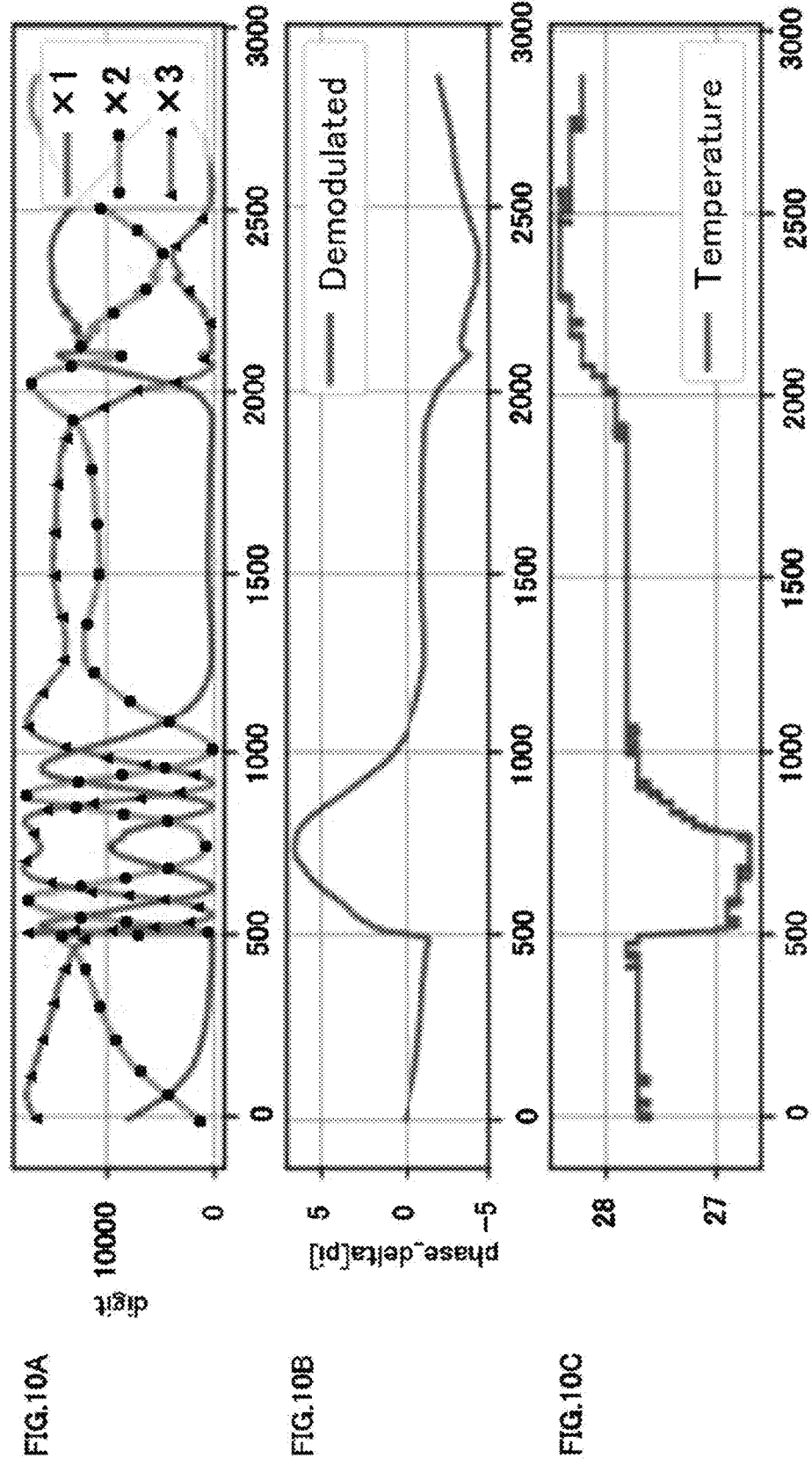
FIGS. 10A-10C are characteristic charts showing the effect of the present invention.

FIGS. 10 and 11 are characteristic charts of the experimental data showing effect example of the present invention, and FIG. 10A shows that the phase change (about 7π) is measured by obtaining the relative displacement d of the accelerator based on the peak values X1, X2 and X3 of the three pulses in the interferometer due to the 3×3 optical coupler omitted the accelerator and the phase detection is performed beyond the laser wave length. In this case, the phase changing is occurred in the interferometer by using the change of the laser wave length based on the temperature. The phase changing is synchronized with the temperature shown in FIG. 10C.

Figures 11A, 11B:
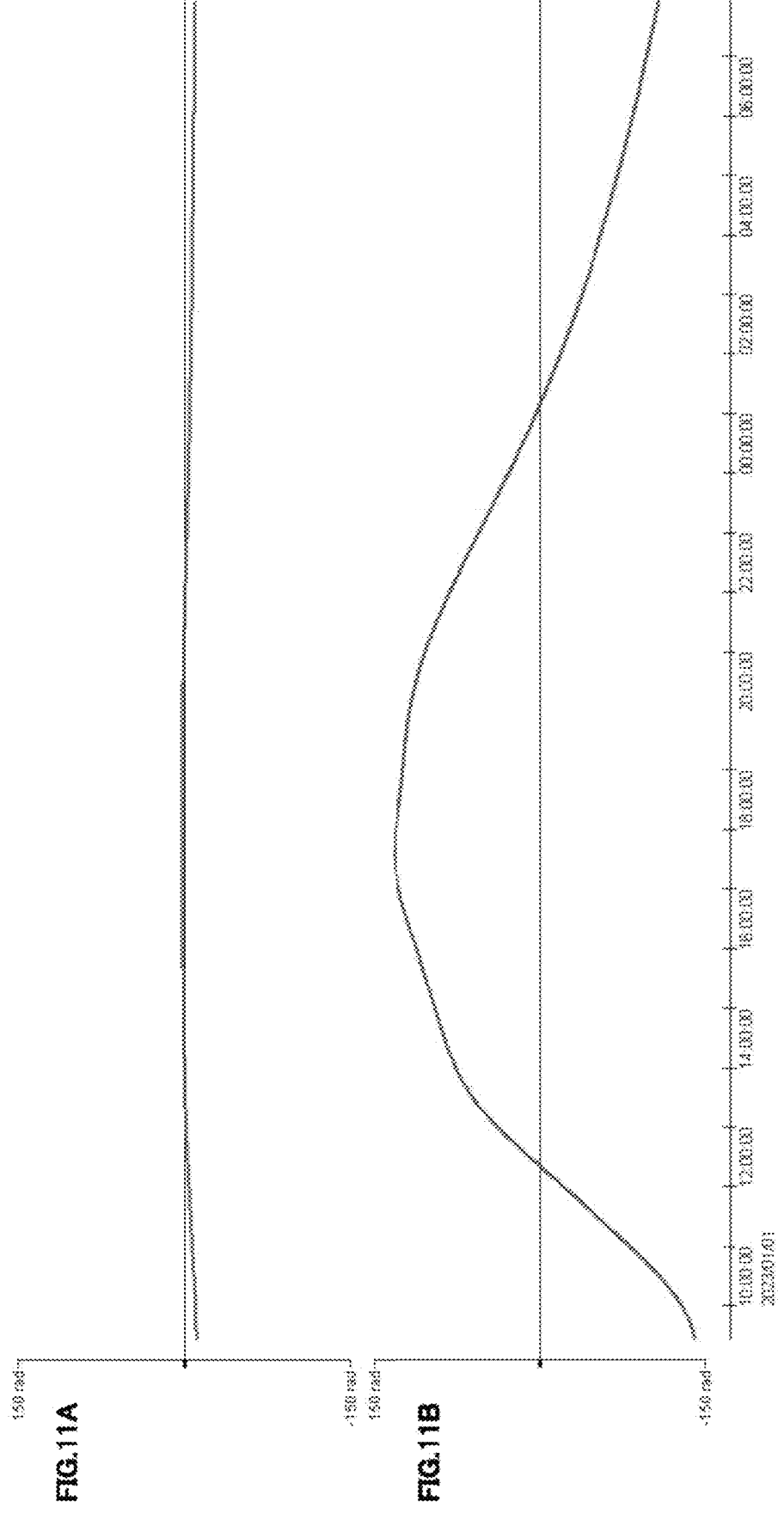
FIGS. 11A and 11B are characteristic charts showing the effect of the present invention (FIG. 11A) compared to a conventional system (FIG. 11B).

FIGS. 11A and 11B show an example of the phase fluctuation amount in comparison with the present invention (FIG. 11A) and the conventional phase shift light-pulse system (FIG. 11B), and FIG. 10A shows the phase fluctuation of the present invention and FIG. 10B does the phase fluctuation of the conventional phase shift light-pulse system. It is clear that the fluctuation is improved by about one tenth.

According to the optical fiber sensor and the measuring system using the same of the present invention, in place of the phase shift light-pulse system with the delay circuit, the sensor section having the interferometer including the measuring object (for example, the accelerator) uses the 3×3 optical coupler and extracts the phase information, and measures by converting the three reflected outputs into one output pulse train with the TDM. Accordingly, it is possible to securely and efficiently remove the influence of the optical transmission path. Since the measured output is converted into the one output pulse train with the TDM, it is possible to contain the three interferometer outputs of the reflected light in the one optical fiber, and there is a merit that the fluctuation of the signal intensity based on the characteristic difference of the plural optical fibers can be reduced from the configurational view. Further, it is possible to compose by using the one O/E converting element since the output is one by the TDM, and there is a merit that the influences of the signal intensity and the frequency characteristic based on the characteristic difference of the O/E converting elements can be greatly reduced from the configurational view. Furthermore, the long distance transmission and the multi-channel are advantageous by respectively TDM-doing the plural interferometer outputs and by centralizing.

By harmonizing the distances of the two interfering paths (the reference path and the measurement path) of the interferometer, there is a merit that the influences (the temperature change, the fluctuation of the light path length due to the refractive index change, and so on) based on the wave length of the light source and the environmental factor of the interferometer can be small. Further, it is possible to shorten the two interference paths and to optionally set the pulse width. The high speed and high accuracy AD (Analog to Digital) converter is not necessary, and the relative cheap configuration is realized.

As the application using the 3×3 optical coupler, it is possible to compose the interferometer with Polarization Maintaining (PM) fiber and without Faraday Rotator Mirror (FRM) in place of the interferometer with the SM fiber. In this case, the operation is possible at the high temperature and the broad temperature range, and the minute sensor can be realized. Further, by constantly keeping the polarization state using the cheap SM fiber for only the light source sending-side transmission fiber, and by using the cheap SM fiber for the interference wave receiving-side transmission fiber, it is possible to reduce the cost of the light transmission path.

By configuring the construction using the waveguide in the 3×3 optical coupler, the fiber in the interference portion becomes unnecessary and the influence of the polarization disappears. Further, the miniaturization also becomes possible.

What is claimed is:

1. An optical fiber sensor,
   wherein laser pulses from a laser source are separated into
      two phases of a reference path and a measurement path including a measuring object, which form an interfer-
ometer, by a second optical coupler via a first optical
coupler;
wherein a first Faraday Rotator Mirror (FRM) is provided
at an end of said reference path, and a second FRM is
provided at an end of said measurement path; and
wherein a reference reflected light of said first FRM and
a measurement reflected light of said second FRM are
interfered at said second optical coupler and are con-
verted into three phases, converted first phase pulses
are transmitted to an optical synthesis section via said
first optical coupler, converted second phase pulses are
transmitted to said optical synthesis section via a first
delay section, converted third phase pulses are trans-
mitted to said optical synthesis section via a second
delay section, and a time division pulse train is output-
ted from said optical synthesis section.

2. The optical fiber sensor according to claim 1, wherein
all transmissions of said laser pulses are performed by using
a single mode (SM) fiber.

3. The optical fiber sensor according to claim 1, wherein
a delay time of said second delay section is longer than a
delay time of said first delay section.

4. A measuring system to measure a displacement of said
measuring object by measuring a peak value of said time
division pulse train as claimed in claim 1.

5. An optical fiber sensor that measuring pulses are
transmitted to "n(≥2)" interferometers respectively includ-
ing a measuring object, and Time Division Multiplexing
(TDM) pulse trains corresponding to respective displace-
ments of said measuring objects from said "n" interferom-
eters are optically synthesized and are outputted,
wherein "n−1" optical couplers to convert laser pulses
into two phases of said measuring pulses and delaying
pulses are provided;

12 wherein a first stage optical coupler inputs laser pulses
from a laser source, and a second stage to (n−1)th stage
optical couplers respectively input said delaying pulses
from a previous stage via a delay section;
wherein n-th optical coupler transmits said delaying
pulses from (n−1)th optical coupler to said n-th inter-
ferometer and inputs;
wherein respective TDM pulse trains outputted from said
"n" interferometers are sequentially and optically syn-
thesized, and a multiple TDM pulse train is outputted;
and
wherein respective said "n" interferometers comprise a
constitution that:
said laser pulses are separated into two phases of a
reference path and a measurement path including a
measuring object, which form an interferometer, by
a second optical coupler via a first optical coupler;
a first Faraday Rotator Mirror (FRM) is provided at an
end of said reference path and a second FRM is
provided at an end of said measurement path; and
a reference reflected light of said first FRM and a
measurement reflected light of said second FRM are
interfered at said second optical coupler and are
converted into three phases, converted first phase
pulses are transmitted to an optical synthesis section
via said first optical coupler, converted second phase
pulses are transmitted to said optical synthesis sec-
tion via a first delay section, converted third phase
pulses are transmitted to said optical synthesis sec-
tion via a second delay section, and a time division
pulse train is outputted from said optical synthesis
section.

* * * * *